April 6, 1943.    O. C. KOPPEN    2,316,077
AIRPLANE ENGINE MOUNT
Filed April 12, 1941    3 Sheets-Sheet 1

INVENTOR
Otto C. Koppen
BY H. F. Kirkpatrick.
ATTORNEY

April 6, 1943.   O. C. KOPPEN   2,316,077
AIRPLANE ENGINE MOUNT
Filed April 12, 1941   3 Sheets-Sheet 2

INVENTOR
Otto C. Koppen
BY H. F. Kirkpatrick
ATTORNEY

April 6, 1943.    O. C. KOPPEN    2,316,077
AIRPLANE ENGINE MOUNT
Filed April 12, 1941    3 Sheets-Sheet 3
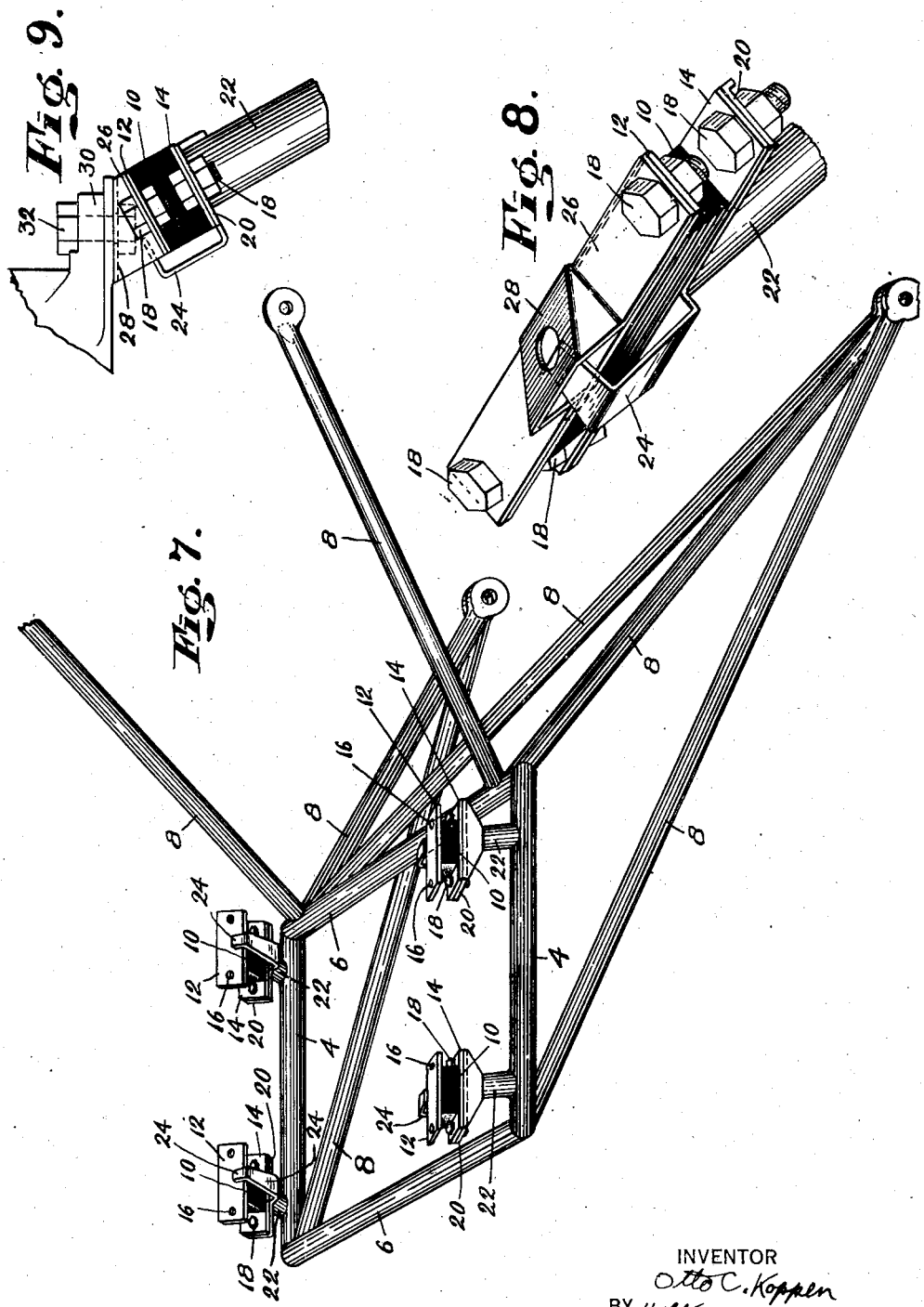
INVENTOR
Otto C. Koppen
BY H. L. Kirkpatrick
ATTORNEY Patented Apr. 6, 1943

2,316,077

UNITED STATES PATENT OFFICE 2,316,077

AIRPLANE ENGINE MOUNT

Otto C. Koppen, Newton, Mass., assignor to General Aircraft Corporation, Dover, Del., a corporation of Delaware Application April 12, 1941, Serial No. 388,323

8 Claims. (Cl. 248—5)

My invention relates to means for mounting in-line, flat, or V engines in airplanes, particularly a flat opposed-cylinder engine in which the axes of the cylinders are arranged in a horizontal plane, for example, as in present-day light airplanes, in which, as is common, the center of gravity of the engine is at a material vertical distance from the longitudinally and laterally spaced supports for the engine. The motor mount is secured to the fuselage usually just ahead of the firewall of the airplane.

In such an engine various shaking forces and moments are generated, each of which has its own frequency. The engine mount likewise has frequencies at which it will transmit rather than absorb either or both types of forces. The airplane also has a frequency or several frequencies of vibration. When the frequencies of engine forces, mount transmission, and airplane vibration coincide, severe and unpleasant and at times destructive vibratory forces are transmitted to the airplane structure.

The object of my invention is to provide a mounting for the engine such that the force transmitted to the airplane structure during normal operation of the engine will be a minimum.

In the drawings:

Fig. 7 is a perspective view of the engine mount of Figs. 5 and 6, with the engine removed, and Fig. 8 is a perspective view, and Fig. 9 is an elevation of one of the mounting elements of Fig. 7.

The principle of my invention is that at each of the points of supports B and C, at which the engine rests on resilient blocks, the vertical component of the deflection in compression of the block due to the application of a lateral force applied to the center of gravity of the engine shall equal the vertical component of the deflection of the block in shear, so that the two components, being opposite and equal in value, cancel each other. That is, referring to Fig. 4, $V_1$ equals $V_2$.

I am thus able to modify the effect of lateral translatory forces applied to the center of gravity of the engine so that they may be absorbed in the resilient mounting blocks without tending to cause rotation of the engine about its center of gravity. This has the effect of reducing the value of the higher frequencies of the vibration which may be transmitted by the resilient mounting blocks, thus improving the attenuation of transmitted vibrations at normal engine speeds.

Figure 1:
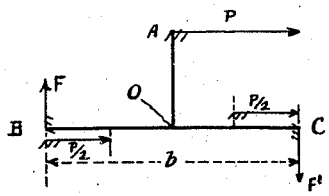
Fig. 1 is a diagram indicating the center of gravity of the engine at A and two supports for the engine at B and C to which the disturbing forces are transmitted.

As shown in Fig. 1 the center of gravity of the engine is at A and the engine is supported at the points B and C on rubber blocks on the frame. The height of the center of gravity above the horizontal plane of these supports is $a$ and the distance between the two points of support is $b$. The intersection is at O. When the force P is applied at A, its turning moment about O is resisted by two opposite forces F and F' of equal magnitude at B and C. There is also a force equal to $$\frac{P}{2}$$

acting horizontally on each rubber block, at B and C.

To maintain the system in rotational equilibrium about O, the vertical reactions F, F', at B and C counteract the turning moment due to the force P, F and F' being equal in magnitude.

$$P \cdot a = 2\left(F\frac{b}{2}\right) = F \cdot b$$

$$F = P\frac{a}{b}$$

That is, the vertical reaction F at B and at C is equal to $$P\frac{a}{b}$$

Figure 2:
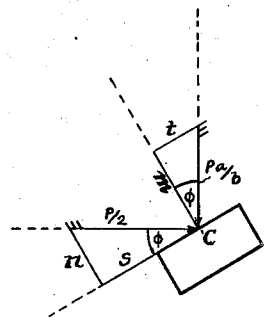
Figs. 2, 3 and 4 are diagrams illustrating the resolution of the forces in a manner to carry out my invention.
Figure 3:
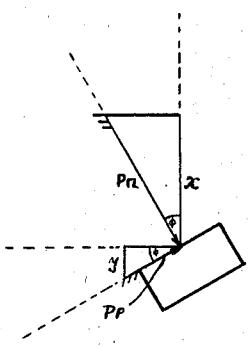

Figs. 2 and 3 illustrate how the pressure $P_n$ normal to the block at C, for example, is calculated, such pressure being the sum of the perpendicular forces due to the vertical force $$P\frac{a}{b}$$

and to the horizontal force $$\frac{P}{2}$$

If there be more than one pair of inclined blocks, the horizontal force would equal P divided by twice the number of pairs of blocks. The angle of the surface of the block to the horizontal is $\phi$.

The perpendicular component $m$ of the vertical force
$$P\frac{a}{b}$$
equals
$$P\frac{a}{b}\cos\phi$$

The perpendicular component $n$ of the force
$$\frac{P}{2}$$
equals
$$\frac{P}{2}\sin\phi$$

(1) $\quad P_n = m+n = P\dfrac{a}{b}\cos\phi + \dfrac{P}{2}\sin\phi$ which is the pressure normal to the block due to the force P acting at A.

Figs. 2 and 3 also illustrate how the pressure $P_p$ parallel to the block or in shear is calculated. The horizontal force
$$\frac{P}{2}$$
has the component $s$, parallel to the surface of the block, equal to
$$\frac{P}{2}\cos\phi$$

The perpendicular force
$$P\frac{a}{b}$$
has an opposite component $t$, parallel to the surface of the block, equal to
$$P\frac{a}{b}\sin\phi$$

(2) $\quad P_p = s - t = \dfrac{P}{2}\cos\phi - P\dfrac{a}{b}\sin\phi$ the pressure parallel to the surface of the block due to the force P acting at A.

Fig. 3 shows how to resolve the forces $P_n$ and $P_p$ into their vertical components $x$ and $y$.

(3) $\quad x = P_n \cos\phi$ and $y = P_p \sin\phi$

Let $K_c$ equal the displacement of the block in compression due to the application of a unit load. Then the deflection of the block due to the load $P_n$ will be $P_n K_c$.

Let $K_s$ equal the deflection of the block in shear due to the application of a unit load in that direction. Then the deflection of the block in shear due to the load $P_p$ will be $P_p K_s$.

Figure 4:
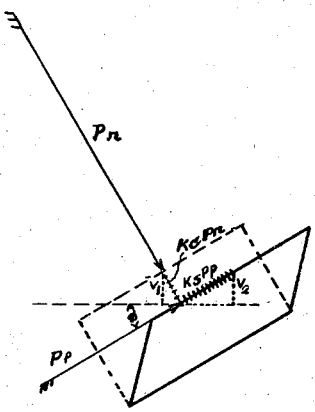

My invention is embodied in a system in which the vertical component $V_1$ of the displacement in depression $K_c P_n$ equals the vertical component $V_2$ of the deflection in shear, $K_s P_p$, as shown in Fig. 4, namely:

(4) $\quad P_n K_c \cos\phi = P_p K_s \sin\phi$ or, (5) $\quad \dfrac{K_c}{K_s} = \dfrac{P_p}{P_n}\tan\phi$ Substituting for $P_n$ and $P_p$ the values in Equations 1 and 2, the ratio of displacement in depression per unit load $K_c$ to the deflection in shear per unit load $K_s$ is:

(6) $\quad \dfrac{K_c}{K_s} = \dfrac{\frac{1}{2} - \frac{a}{b}\tan\phi}{\frac{a}{b\tan\phi} + \frac{1}{2}}$ or, solving for $\tan\phi$:

(7) $\quad \tan\phi = \dfrac{b}{4a}\left(1 - \dfrac{K_c}{K_s}\right) \pm \dfrac{1}{4}\sqrt{\dfrac{b^2}{a^2}\left(\dfrac{K_c}{K_s} - 1\right)^2 - 16\dfrac{K_c}{K_s}}$ Given the ratio $K_c$ to $K_s$ and the ratio
$$\frac{a}{b}$$
the angle $\phi$ of the surface of the block to the horizontal is determined by Equation 7.

In a given airplane the height $a$ of the center of gravity above the horizontal plane of the points of support of the engine and the distance $b$ between those points are known. Also a rubber block may be selected which has known appropriate displacement characteristics in compression and in shear. With these known factors the value of $\phi$ may be obtained from Equation 7.

For example, suppose
$$\frac{K_c}{K_s} = \frac{1}{10} \text{ and } \frac{a}{b} = \frac{1}{2}$$
solving the Equation 7 gives the angle $\phi$ as 37° 35′+.

By my invention the effects of lateral disturbing forces, which may be regarded as acting at the center of gravity of the engine, may be absorbed and effectively attenuated without giving rise to such further disturbances as might in turn cause transmission of vibrations through the engine mount at such higher frequencies as might fall in the range of frequencies of vibrations generated by engine operation in normal flight.

If the resilient masses used for mounting the engine are not in the shape of a rectangular solid, parallelepiped, or other body with two parallel plane faces, the body should be oriented as in the above formula with the angle $\phi$ defined as the angle between the plane of shear of said body and the horizontal, the resilient body being free to be deformed in shear. The provision of unconfined edge surfaces between the surface of attachment to the engine and the surface of attachment to the airplane structure permits deflection of the resilient body in shear.

By my invention the mount of an in-line, flat, or V engine in an airplane may be designed so that its motion is equivalent to two separate systems, one in pure rotation and the other in pure lateral displacement. The natural frequencies of vibration for each of these modes of vibration may be calculated by methods well known in the art from the stiffness of the system of blocks in the corresponding type of deflection and the mass and moments of inertia of the engine. The designer can thus control the individual natural frequencies so that neither will occur in the operating range of the engine in flight.

For the purpose of illustrating the invention a system consisting of two resilient blocks providing points of support in the vertical plane passing through the center of gravity has been explained. In mounting an engine, however, a minimum of three points of support are necessary. In such case two of the three points function as a pair in accordance with the herein described invention, the remaining point being in the vertical plane of the crankshaft. In actual practice, however, I prefer a mount consisting of two pairs of blocks, one forward and one rearward of the center of gravity of the engine, each pair designed as above described, with the distance $a$ now being the perpendicular distance from a horizontal line through the center of gravity to the line joining the pair of blocks in question. It is desirable to have the distance of one pair forward of the center of gravity equal to the distance of the other pair back of the center of gravity in order to avoid the necessity of compensating for this asymmetry as by making one pair of blocks different from the other pair.

Figure 5:
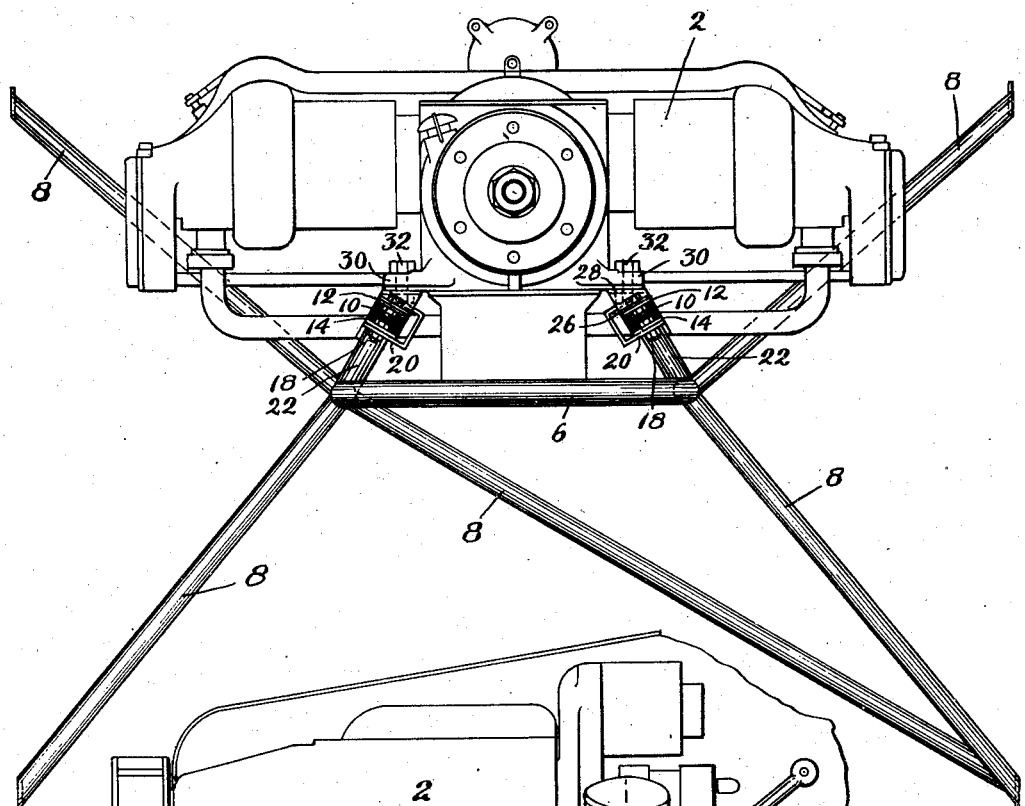
Figs. 5 and 6 show, in front and side elevation respectively, a preferred form of engine mount constructed according to the present invention in which a conventional type of horizontal flat-four engine is supported on a frame which is secured by struts to the front end of the fuselage of the airplane.
Figure 6:
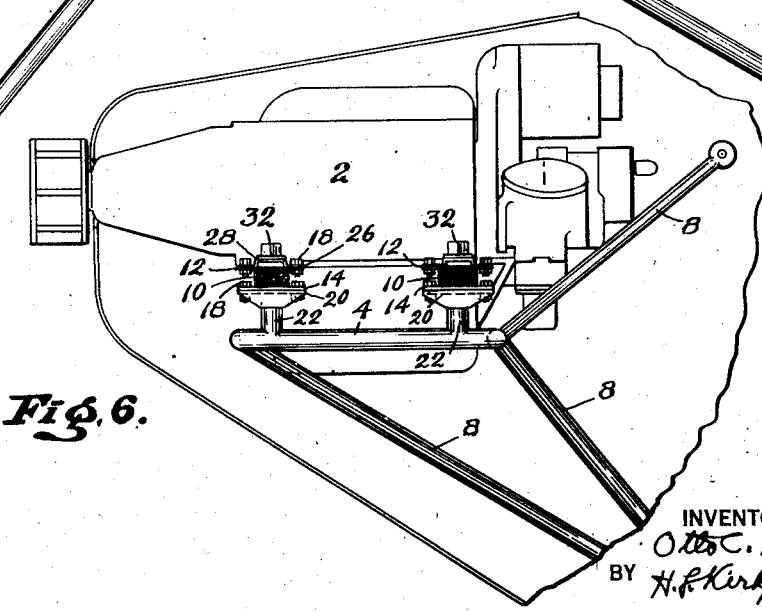

One form of this preferred type of mount is illustrated in Figs. 5–9. Figs. 5 and 6 show a flat-opposed type of engine mounted in the preferred form of mount. Fig. 7 shows this form of mount together with supporting struts, but with the engine removed in order to show the orientation and location of the resilient mounting blocks. Figs. 8 and 9 show in detail the means by which each mounting block of Fig. 7 is secured to the engine and to the mounting frame or struts of the airplane.

Referring to Figs. 5 and 6, the engine 2 is shown mounted on resilient blocks 10 which are secured to short members 22, fixed on longitudinal members or struts 4 which together with lateral struts 6 form a rectangular frame, Fig. 7. This frame is supported by struts 8 which secure it to the front end of the fuselage proper of the airplane.

Each mounting block 10, as shown in detail in Figs. 7, 8, and 9, is cemented or otherwise securely fastened to two plates, preferably of metal, 12 and 14, one at the top and one at the bottom. These plates are longer than the block and extend beyond it at both ends. These extensions are drilled, as at 16, Fig. 7, to receive bolts 18. The blocks together with top and bottom plates form readily replaceable units. The bottom plate 14 is bolted to a flange 20 of a sheet metal fitting secured (as by welding or riveting) to a short strut or support 22 which is fastened, as by welding, to the struts 4 forming the frame. The flange 20 is provided with a tongue 24 bent twice at right angles so that it may act as a stop to limit the stretching of the resilient block to a safe value. In normal operation this stop 24 is out of contact with the top plate 12, and serves only as a safety device if the block stretches too far or fails.

The top plate 12 is bolted to a fitting 26 which is bent in the center to form an angular raised portion 28 leaving a space between it and the plate 12 to accommodate the end of the tongue 24. The angular raised portion 28 is so designed that when the block is in position on the frame and the fitting 26 is bolted to the plate 12, the top of the raised portion 28 furnishes a horizontal surface for fastening to the mounting boss 30, Fig. 9, of the engine. The raised portion 28 is fixed to the mounting boss 30 by means of a bolt 32.

The angle at which the resilient blocks 10 are set is calculated by means of the Formula 7, given above, from the dimensions of the particular installation and the physical characteristics of the resilient blocks. This formula and the principle of this invention therein embodied may, of course, also be used for the orientation of resilient supporting masses for mounting flat or V type engines in types of mounting construction other than the preferred form herein described in detail, for example, one in which the center of gravity lies below the supports for the engine, as in an inverted vertical or V type engine.

I claim:

1. An engine mount of the horizontal type for an engine with an approximately horizontal crankshaft and having at least one row of cylinders aligned therewith, said mount comprising a plurality of resilient masses supporting said engine, at least a pair of said masses being located on opposite sides of a vertical plane passing through the axis of said crankshaft, means for fastening said masses to a supporting framework and to said engine providing for motion in shear and in compression during operation of said engine, and said oppositely located masses having their planes of shear so oriented that the vertical component of the deflection of said masses in compression resulting from a lateral translatory force generated by said engine is equal and opposite to the vertical component of the deflection of said masses in shear resulting from said force.

2. An engine mount of the horizontal type for an engine with an approximately horizontal crankshaft, said engine having at least one row of cylinders aligned with said crankshaft, said mount comprising at least three longitudinally and laterally spaced resilient masses supporting said engine and symmetrically disposed with reference to the axis of said crankshaft, at least each of a pair of said masses being laterally spaced from said crankshaft and located on opposite sides of the vertical plane passing through said axis of said crankshaft, means for fastening said masses to a supporting framework and to said engine providing for motion in shear and in compression during operation of said engine, and said oppositely located masses having their planes of shear so oriented that the vertical component of the deflection of said masses in compression resulting from a lateral translatory force generated by said engine is equal and opposite to the vertical component of the deflection of said masses in shear resulting from said force.

3. An engine mount of the horizontal type for an engine the crankshaft of which is disposed on an axis approximately parallel to the plane of its points of support and the center of gravity of which engine is within the vertical projection of the area defined by said points of support, said mount comprising a plurality of resilient masses supporting said engine at said points of support, at least a pair of said masses being located on opposite sides of a vertical plane passing through the axis of said crankshaft, each of said last mentioned masses being fastened to said engine and to a supporting framework on opposite sides of a plane of shear and being so positioned that the angle $\phi$ between said plane of shear and the horizontal is defined by the formula:

$$\operatorname{Tan} \phi = \frac{b}{4a}\left(1 - \frac{K_c}{K_s}\right) + \frac{1}{4}\sqrt{\frac{b^2}{a^2}\left(\frac{K_c}{K_s} - 1\right)^2 - 16\frac{K_c}{K_s}}$$

wherein $a$ is the vertical projection of a line from the center of gravity perpendicular to the line joining said oppositely located resilient masses; $b$ is the distance between the points of engine support on said masses; $K_c$ is the coefficient of deflection in compression of said resilient masses, and $K_s$ is the coefficient of deflection in shear of said resilient masses.

4. In combination, an engine in which the horizontal translatory vibratory forces generated thereby are concentrated in substantially the same direction, a supporting framework underlying at least a part of said engine including its center of gravity, a plurality of resilient blocks supporting said engine on said framework, the blocks of at least one pair of which are located on opposite sides of a plane passing through said center of gravity and perpendicular to said direction and means for positioning the blocks of said pair with their load-carrying surfaces at such an angle that the vertical component of the deflection of said blocks in compression as a result of said lateral forces is balanced by the vertical component of the deflection of said blocks in shear produced by said forces.

5. An engine mount for an engine the cylinders of which are horizontally opposed, said mount comprising at least two pairs of resilient blocks, the blocks of each pair being located on opposite sides of a plane perpendicular to the cylinder axes and passing through the center of gravity of said engine, each of said blocks having a plane of shear so oriented that the vertical component of the deflection of said block in compression as a result of lateral translatory forces generated in said engine is balanced by the vertical component of the deflection of said block in shear produced by said forces.

6. In an engine mount of the horizontal type for an engine with an approximately horizontal crankshaft, the combination of a plurality of resilient masses supporting said engine, each of at least one pair of said masses being located on opposite sides of and spaced from a vertical plane passing through the axis of said crankshaft, each of said oppositely disposed masses having its plane of shear so oriented that the vertical component of the deflection of said masses in compression resulting from a lateral translatory force generated by said engine is equal and opposite to the vertical component of the deflection of said masses in shear resulting from said force.

7. In combination, an engine having its cylinders in horizontal opposed arrangement, a supporting framework underlying at least a part of said engine and also its center of gravity, a plurality of resilient blocks supporting said engine on said framework at least a pair of which blocks is located on a line approximately parallel to the axes of said cylinders and means permitting deflection in compression and in shear for fastening said blocks to said engine and to said supporting framework and for positioning said blocks at such an angle that the vertical component of the deflection of said blocks in compression as a result of lateral translatory forces generated in said engine is balanced by the vertical component of the deflection of said blocks in shear produced by said forces.

8. In combination, an engine in which the horizontal transitory vibratory forces generated thereby are concentrated in substantially the same direction, a supporting framework for said engine, a plurality of resilient blocks supporting said engine on said framework, the center of gravity of said engine being within the vertical projection of the area defined by said blocks, the blocks of at least one pair of which are located on opposite sides of a vertical plane passing through said center of gravity and perpendicular to said direction and means for positioning the blocks of said pair with their load carrying surfaces at such an angle that the vertical component of the deflection of said blocks in shear as a result of said lateral forces is balanced by the vertical component of the deflection of said blocks normal to said shear produced by said forces.

OTTO C. KOPPEN.